(No Model.) 2 Sheets—Sheet 2.
G. D. BAIRD.
COMBINED PLOW AND PULVERIZER.
No. 384,110. Patented June 5, 1888.
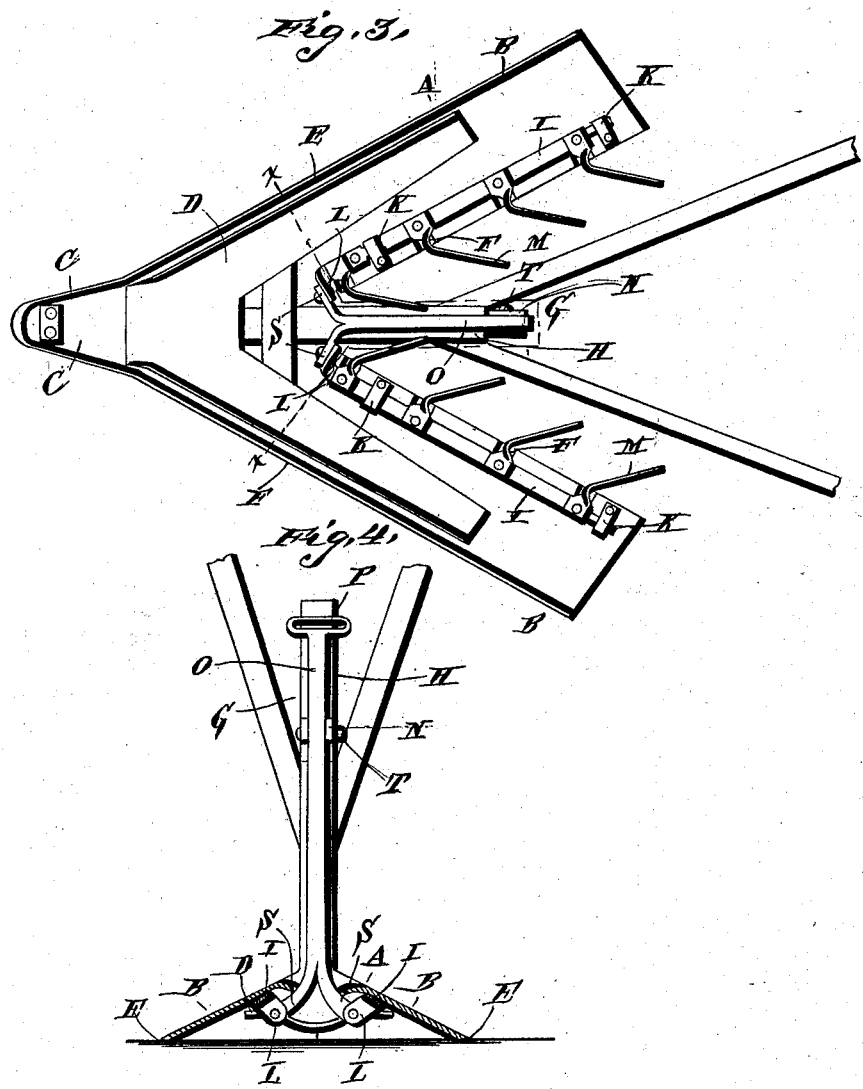
WITNESSES.
INVENTOR.
George D. Baird,
by C. A. Knowles
Attorneys.

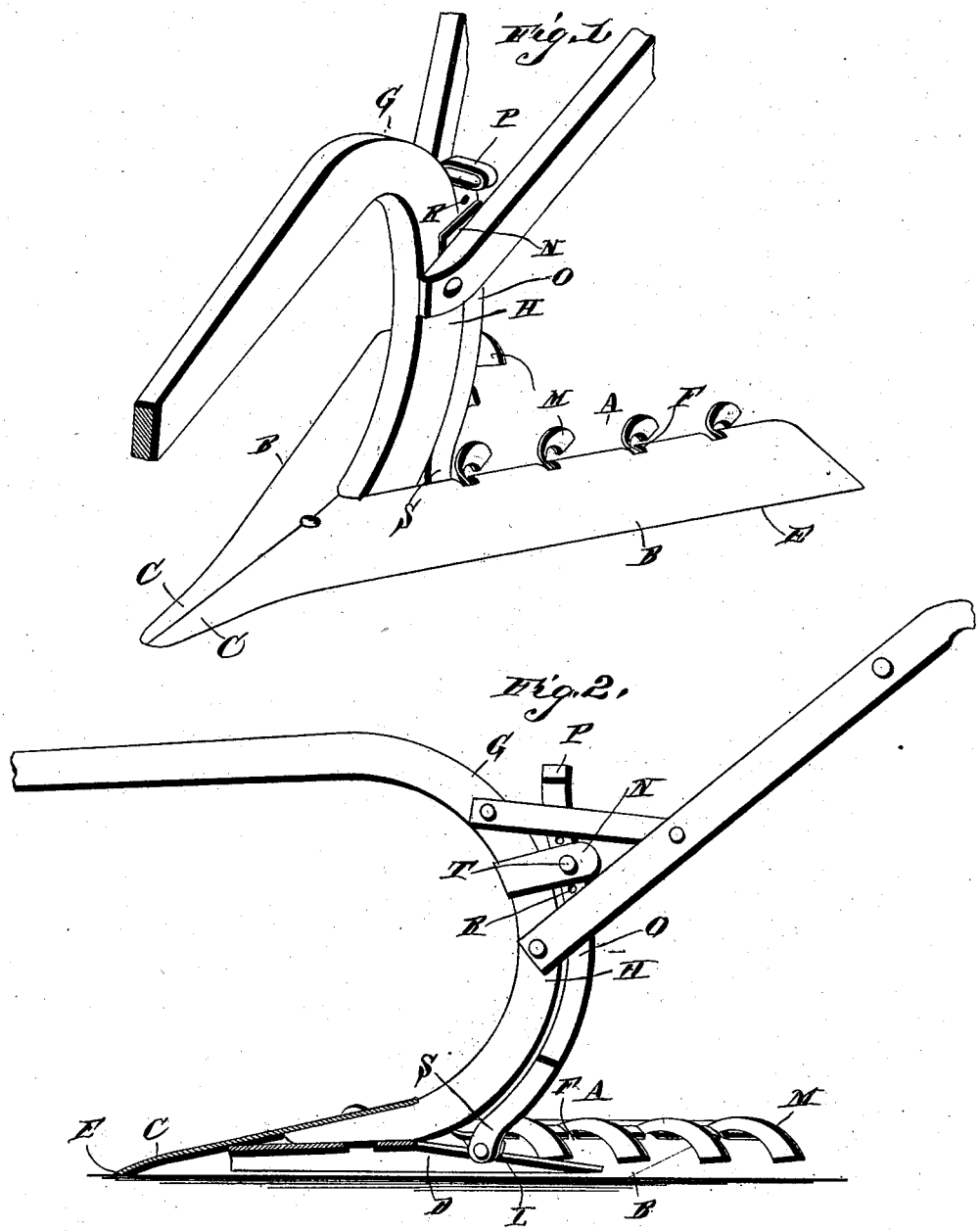

United States Patent Office.

GEORGE D. BAIRD, OF AMBOY, ILLINOIS.

COMBINED PLOW AND PULVERIZER.

SPECIFICATION forming part of Letters Patent No. 384,110, dated June 5, 1888.

Application filed March 22, 1888. Serial No. 268,091. (No model.)

*To all whom it may concern:*

Be it known that I, GEORGE D. BAIRD, a citizen of the United States, residing at Amboy, in the county of Lee and State of Illinois, have invented a new and useful Improvement in Combined Plows and Pulverizers, of which the following is a specification.

My invention relates to an improvement in combined plows and pulverizers; and it consists in the peculiar construction and combination of devices that will be more fully set forth hereinafter, and particularly pointed out in the claims.

In the accompanying drawings, Figure 1 is a perspective view of a combined plow and pulverizer embodying my improvements. Fig. 2 is a vertical longitudinal central sectional view of the same. Fig. 3 is a bottom plan view of the same. Fig. 4 is a transverse sectional view of the same, taken on the line $xx$ of Fig. 3.

A represents my improved plowshare, which consists of a pair of rearward-diverging inclined mold-boards, B, which are provided with forward-extending points, C, at their meeting ends, the said points and th said mold-boards being united, as shown, and secured to a V-shaped brace plate or casting, D, which conforms to the shape of the share and is bolted to the under sides of the mold-boards thereof at the meeting ends of the same, the said base plate or casting being secured to the share at such a distance from the lower edges thereof that the said base-plate will be out of contact with the earth. The lower edges of the mold-boards and of the point C are beveled and caused to lie flat on the ground, thereby providing the said mold-boards with sharp cutting-edges E, which are self-sharpening, and will be kept ground to a fine edge by the friction of the share with the bottom of the furrow, thereby greatly increasing the efficiency of the plow.

The inner upper edges of the mold-boards or wings of the plow are curved downwardly, as shown, and are provided with open slots or notches F, which are at right angles to the said mold-boards or wings.

G represents the plow-beam, which has a curved standard, H, formed integral therewith at the rear end thereof, and said curved standard is secured to the front end of a V-shaped brace plate or casting, D, so that the draft will be exerted directly on the front end of the plowshare, and will tend to cause the point of the share to enter the ground and run therein at a uniform depth.

The diverging mold-boards or wings raise slices of earth from opposite sides of the furrow when the plow is in operation, and, inasmuch as the said mold-boards or wings are inclined at an angle of about thirty degrees with relation to the bottom of the furrow, the said slices of earth which are raised by the said wings or mold-boards are not overturned and caused to lie bottom up, as in the case with the mold-board of an ordinary turning-plow; but said slices are caused to slip rearward over the curved inner sides of the said mold-boards or wings and drop back into the furrow.

In order to cause the earth to be thoroughly broken and pulverized as the slices fall into the bottom of the furrow and the plowshare passes under them, I provide the pulverizing devices hereinafter described.

I represents a pair of rock-shafts, which are arranged under the upper inner sides of the mold-board or wings and are journaled in bearings K. The inner ends of the said rock-shafts are provided with crank-arms L, and to the said rock-shafts are bolted or otherwise secured the lower front ends of a series of curved colters or cutters, M, said colters or cutters being of the shape shown in the drawings, extending through the slots or notches F in the wings or mold-boards, and being bent rearwardly and arranged obliquely to the wings or mold-boards, as shown. The upper edges of the said cutters or colters are sharpened, and the same are thereby adapted to cut through the slices of earth as the latter slip over the mold-boards or wings, and thereby the cutters or colters are caused to thoroughly stir and pulverize the said slices before the latter drop into the furrow, thus completing the operation of preparing the soil for the crop.

N represents a keeper, which projects rearward from the standard H, and O represents a vertically-adjustable rod, which has a handle, P, at its upper end, and is provided at its central portion with a series of adjusting-openings, R, and has its lower end bifurcated, thereby forming arms S, which are loosely connected to the crank-arms L. A bolt, T, is adapted to pass through either of the openings R and through openings in the keeper N, so as to secure the rod O to the standard at any desired vertical adjustment, and thereby maintain the cutters or colters M at any desired angle when the plow is in operation.

A plow thus constructed is adapted to cut a much wider furrow than an ordinary turning-plow and without greater exertion on the part of the team, and puts the ground at once in condition for planting a crop, no subsequent harrowing of the ground being necessary.

It will be of course understood that my improved plow is not adapted and is not intended for use in plowing sod-land.

Having thus described my invention, I claim—

1. The combination of the plowshare having the rearward-diverging wings or mold-boards with the rock-shafts journaled under the upper inner sides of said mold-boards or wings, the cutters or colters M, attached to said rock-shafts, and devices, substantially as set forth, attached to said rock-shafts to secure the same and the cutters at any desired angle, substantially as described.

2. The combination of the plowshare having the diverging wings, the rock-shafts journaled under said wings, the cutters attached to said shafts, the standard secured to the share, the keeper N on the rear side of the standard, and the rod O, secured to the rock-shafts and projecting through said keeper and adjustably secured therein, as set forth.

In testimony that I claim the foregoing as my own I have hereto affixed my signature in presence of two witnesses.

GEORGE D. BAIRD.

Witnesses:
FRANK J. MERROW,
CHARLES W. BELL.